(12) United States Patent
Edinger

(10) Patent No.: US 9,682,871 B2
(45) Date of Patent: Jun. 20, 2017

(54) APPARATUS FOR KILLING AND PREVENTING GROWTH OF ALGAE AND BACTERIA IN THE PIPING, FILTERING AND PUMPING COMPONENTS OF WATERMAKER SYSTEMS DURING PERIODS OF NON-USE

(71) Applicant: Spectra Watermakers, Inc., San Rafael, CA (US)

(72) Inventor: William J. Edinger, Tiburon, CA (US)

(73) Assignee: KATADYN DESALINATION, LLC., San Rafael, CA (US)

( * ) Notice: Subject to any disclaimer, the term of this patent is extended or adjusted under 35 U.S.C. 154(b) by 759 days.

(21) Appl. No.: 13/829,321

(22) Filed: Mar. 14, 2013

(65) Prior Publication Data

US 2014/0262991 A1  Sep. 18, 2014

(51) Int. Cl.
| | |
|---|---|
| C02F 1/00 | (2006.01) |
| C02F 9/00 | (2006.01) |
| C02F 1/44 | (2006.01) |
| C02F 1/46 | (2006.01) |
| C02F 1/50 | (2006.01) |
| C02F 103/08 | (2006.01) |

(52) U.S. Cl.
CPC .............. *C02F 1/001* (2013.01); *C02F 1/008* (2013.01); *C02F 9/00* (2013.01); *C02F 1/44* (2013.01); *C02F 1/4606* (2013.01); *C02F 1/50* (2013.01); *C02F 2103/08* (2013.01); *C02F 2201/005* (2013.01); *C02F 2209/40* (2013.01); *C02F 2303/04* (2013.01); *C02F 2303/08* (2013.01); *C02F 2303/20* (2013.01)

(58) Field of Classification Search
None
See application file for complete search history.

(56) References Cited

U.S. PATENT DOCUMENTS

| | | | | |
|---|---|---|---|---|
| 4,059,498 A | * | 11/1977 | Crissman | ................ B03C 5/024 |
| | | | | 204/562 |
| 4,869,016 A | | 9/1989 | Diprose et al. | |
| 4,981,594 A | | 1/1991 | Jones | |
| 5,635,059 A | | 6/1997 | Johnson | |
| 5,770,037 A | * | 6/1998 | Goto | .................... C02F 1/46114 |
| | | | | 205/701 |

(Continued)

*Primary Examiner* — Richard Gurtowski
(74) *Attorney, Agent, or Firm* — Hamrick IP-Law Office; Claude A. S. Hamrick

(57) ABSTRACT

An algae and bacteria contamination preventing apparatus and subsystem including a conduit forming a flush-water flow path between a potable water supply and a connection to a feed water entry port of a watermaker system. A check-valve and flush-water connector is installed in the feed water entry conduit. The flush-water flow path includes a valve means for opening and closing the flow path, a filter/ion-generator component a controller for sensing flush-water flow in the flow path, and in response thereto, applying electrical power to an ion-generating element of the filter/ion-generator component. The filter/ion-generator component also includes a filter element which removes undesirable chemicals from the potable flush-water before the ion-generating element introduces copper and/or silver ions into the flush-water. The valve means may be manually operated or be controlled by a watermaker system shut down controller.

6 Claims, 4 Drawing Sheets

(56) References Cited

U.S. PATENT DOCUMENTS

| | | |
|---|---|---|
| 6,183,646 B1 | 2/2001 | Williams et al. |
| 6,350,385 B1 | 2/2002 | Holt et al. |
| 6,495,052 B1 | 12/2002 | Miyamoto et al. |
| 6,783,687 B2 | 8/2004 | Richard |
| 7,229,555 B1 | 6/2007 | Edinger |
| 2005/0139530 A1* | 6/2005 | Heiss .................. C02F 9/00 210/85 |
| 2006/0201891 A1 | 9/2006 | Holt et al. |

* cited by examiner

APPARATUS FOR KILLING AND PREVENTING GROWTH OF ALGAE AND BACTERIA IN THE PIPING, FILTERING AND PUMPING COMPONENTS OF WATERMAKER SYSTEMS DURING PERIODS OF NON-USE

BACKGROUND OF THE INVENTION

Field of the Invention

The present invention relates generally to desalination systems of the type used in sea going vessels and small watermaker systems to produce fresh water from sea water or brackish water, and particularly, to a means and apparatus for killing and preventing algae and bacteria from growing in the piping, filtering and pumping components of such systems during periods of non-use.

Description of the Prior Art

Because seagoing vessels can only carry limited amounts of fresh water in their holding tanks, long voyages can be constrained by how much fresh water can be carried before having to replenish. Thus, for many years, watermaking systems have been provided using various filtration techniques and processes to produce potable water from seawater. Such processes range from the use of very coarse filtering devices that merely strain out solids, to advanced filtration systems incorporating reverse osmosis (RO) membranes that can remove fine colloids and particulates to produce clear, fresh water permeate or "product water".

One such RO system is disclosed in my prior U.S. Pat. No. 7,229,555 entitled "Low-maintenance Watermaker" issued Jun. 12, 2007 and expressly incorporated herein by reference. The described water treatment system consists of a pre-filtration system including one or more pump or pumps and filter elements, and a spiral wound RO membrane in a pressure vessel. A reverse osmosis system of such type is subject to long periods of non-use in which water stands in the feed water flow path. As a consequence, during the system shutdown, bacteria and algae can grow in the piping, filter apparatus, pumps and membrane, rendering the system inoperable or inefficient. Moreover, the bacteria often goes anaerobic producing hydrogen sulfide which will permeate through the RO membrane and contaminate the product water.

Often a fresh water flush system is installed to flood the system during shutdown to reduce the bacterial and algae counts and reduce the effects of corrosion due to the salts in the system. And if the system is to be decommissioned or shut down for more than a few days, chemicals are usually circulated through the feed water flow path to sterilize and prevent the growth of bio film from the bacteria and algae resident therein. But such maintenance is expensive, inconvenient, and time consuming, and long periods of non-use without proper advance attention can result in serious systemic corrosion and contamination as well as biofouling of the RO membranes.

However, it has been found that by adding copper and silver ions, or in some cases just copper or just silver ions into the flush water during the shutdown of the system, the bacteria that attack the membrane and produce hydrogen sulfide can be killed without the introduction of harsh chemicals to the system. Moreover, the introduction of the ions can be made fully automatic and not require the system operator to mix and apply treatment chemicals, and perform the storage procedures required such chemicals are used.

It is therefore an objective of the present invention to provide an algae and bacteria contamination abatement means and apparatus for simplifying the preventive maintenance process by using an electrolytic method and apparatus to produce and introduce ions into a stream of flush water during the system shutdown process so as to flood the system plumbing, pumping and filtering components with metallic ions to kill any resident bio organisms.

Another objective of the present invention is to provide a novel algae and bacteria contamination preventing apparatus and subsystem including means for allowing previously generated potable water to be used to batch produce ion carrying fluid for introduction into a watermaker system during its normal shutdown process.

Still another objective of the present invention is to provide a novel algae and bacteria contamination abatement subsystem including a dual functioning filter/ion-generator component for simultaneously removing any vestiges of chlorine from potable water used as the flush water and electrolytically generating and introducing copper and/or silver ions into the water.

SUMMARY OF THE INVENTION

Briefly, an embodiment of a novel algae and bacteria contamination preventing apparatus and subsystem in accordance with the present invention includes a conduit forming a watermaker flush-water flow path between a potable water supply and the feed water entry port of a watermaker system, a filter/ion-generator component disposed along the flush-water flow path, a valve means for opening and closing the flush-water flow path, and a controller for sensing flush-water flow in the flow path, and in response thereto applying electrical power to an ion-generating element of the filter/ion-generator component. In addition, a check-valve is installed proximate the feed water entry port to insure that the flush-water is not lost through the feed water port. The filter/ion-generator component also includes a filter which filters undesirable chemicals from the potable water before the ion-generating element introduces copper and/or silver ions into the flush-water. The valve means may be manually operated or be controlled by a watermaker system shut down controller.

An advantage of the present invention is that it provides a novel algae and bacteria contamination preventing subsystem that can be easily installed in an existing watermaker system without substantial modification of the system plumbing.

Another advantage of the present invention is that it provides a mechanically simple subsystem of the type described which can be either manually or automatically turned on during a watermaker system shut down process.

Yet another advantage of the present invention is that it provides a novel algae and bacteria contamination preventing apparatus and subsystem which avoids the necessity of using bacteria and algae killing chemicals as part of the maintenance procedure required in a desalination system.

Still another advantage of the present invention is that it provides a novel algae and bacteria contamination abatement apparatus including a carbon-block-filter/ion-generator assembly having depletable elements that can easily be replaced without special tools or watermaker system interruption.

These and other objects and advantages of the present invention will no doubt become apparent to those of ordinary skill in the art after having read the following detailed description of the preferred embodiments which are illustrated in the several figures of the drawing.

IN THE DRAWING

Figure 1:
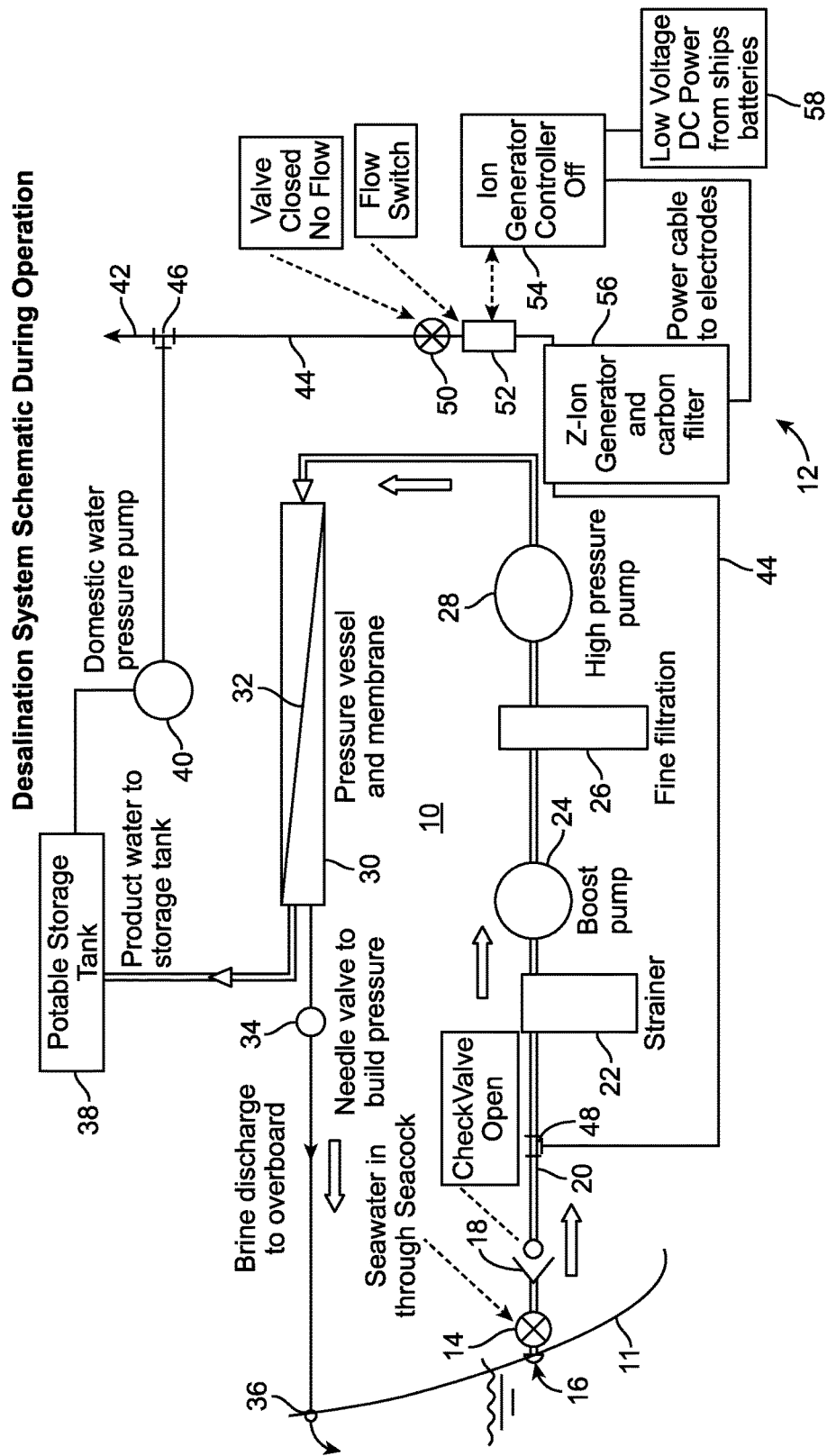
FIG. 1 is a functional block diagram schematically illustrating an improved water desalination system in normal operation and having an embodiment of the present invention installed.
Figure 2:
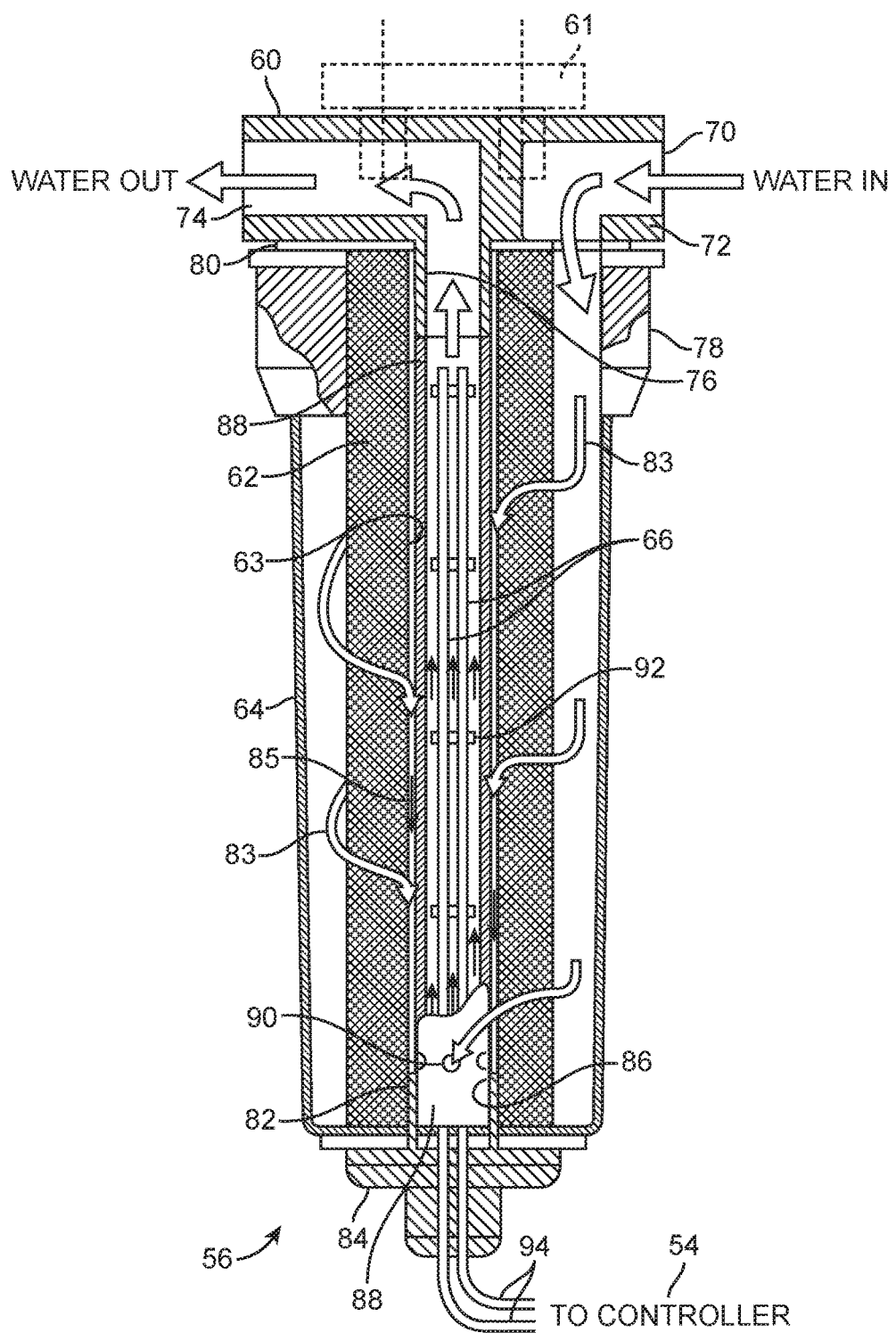
FIG. 2 is a cross sectional view taken through a combination filter and ion-generator unit provided in the embodiment of FIG. 1.
Figure 3:
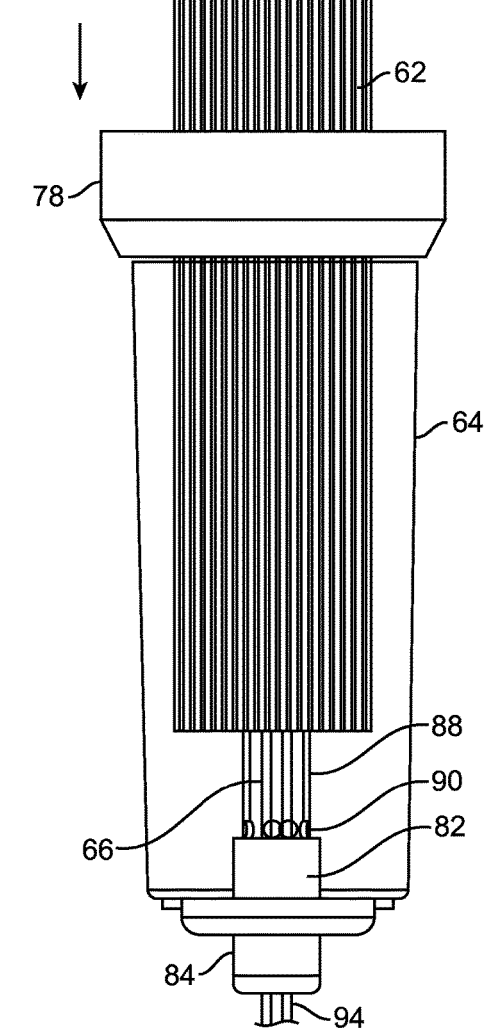
FIG. 3 is a partially exploded pictorial view showing assembly details of the filter and ion-generator unit illustrated in FIG. 2.
Figure 4:
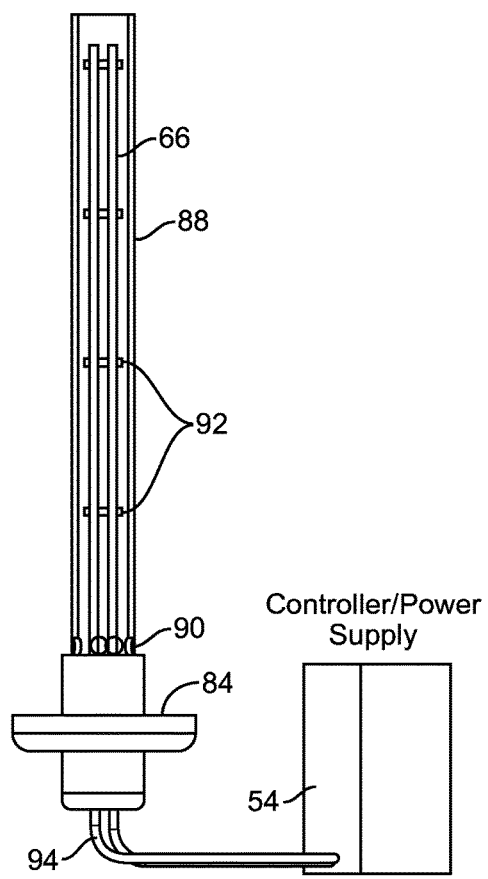
Figure 5:
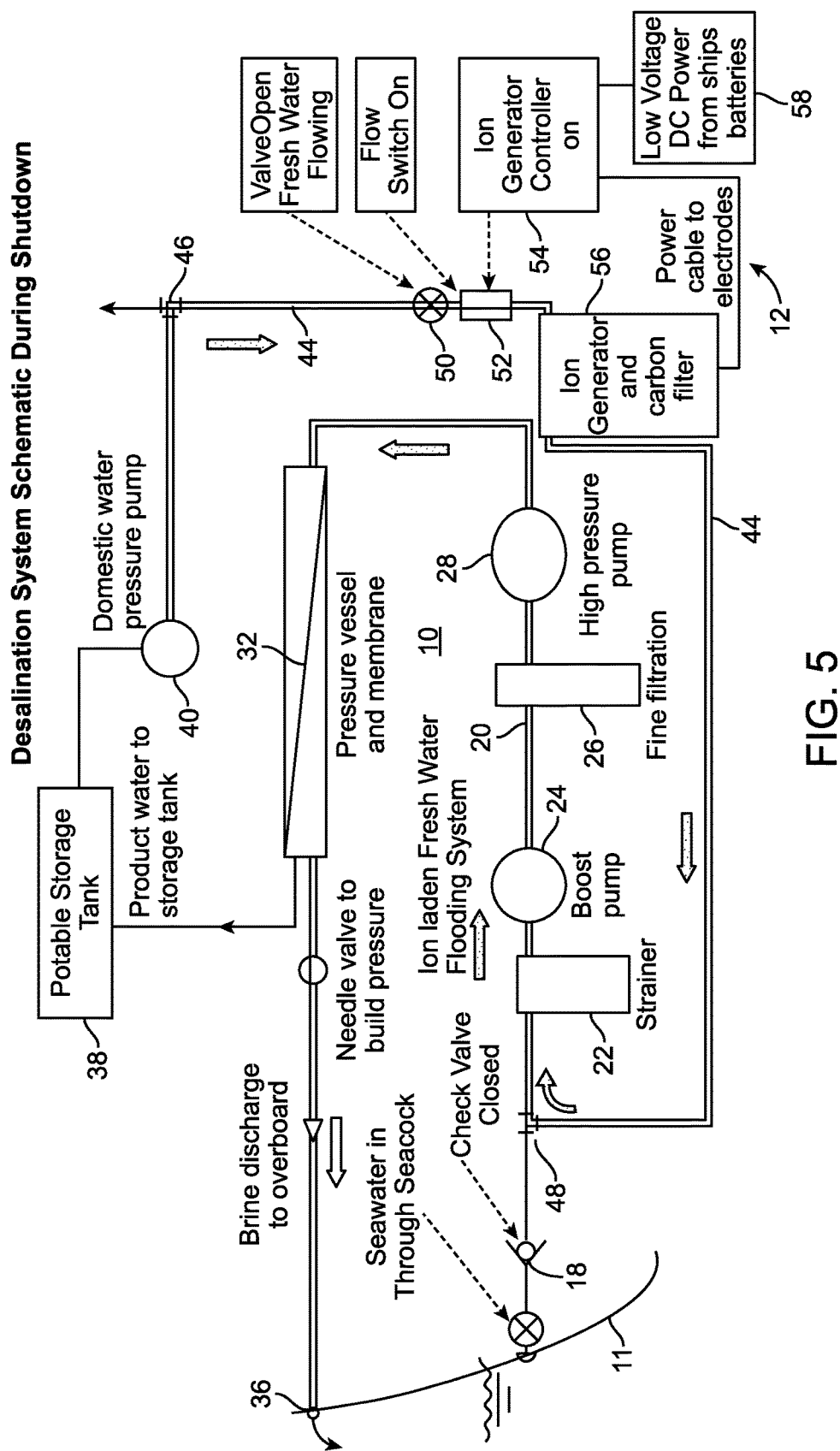

FIG. 4 is a pictorial view further illustrating the ion-generator component of the unit illustrated in FIGS. 2 and 3; and FIG. 5 is a functional block diagram illustrating the improved water desalination system of FIG. 1 during its shut down process and depicting the manner in which a batch of ion containing flush-water is introduced into the system plumbing during a shut down operation in accordance with the present invention.

DETAILED DESCRIPTION OF AN EMBODIMENT OF THE INVENTION

Referring now to FIG. 1 of the Drawing, a functional block diagram is shown schematically illustrating a water desalination system 10, which may be of the type generally described in my above mentioned prior U.S. patent or other similar watermaker systems. For purposes of illustration, the system 10 is schematically shown installed in a floating boat generally represented by the hull line 11. In addition to the system 10, an embodiment 12 of an algae and bacteria contamination preventing apparatus and subsystem in accordance with an embodiment of the present invention is also shown in block diagrammatic form.

As depicted, the desalination system 10 includes a seacock 14 coupled to a below-waterline forward-facing, scoop type of inlet port 16. The outlet side of seacock 14 is connected via a check valve 18 and system flow conduit 20 to a strainer 22 which removes seaweed and large debris from the entering seawater. The output side of filter 22 is connected by conduit 20 to a boost pump 24 used to draw the seawater through the inlet port 16 and force it through a fine strainer 26, which removes any finer material, to the inlet side of a high pressure pump 28.

Pump 28 supplies the pressurized pre-filtered water to a pressure vessel 30 including a reverse osmosis membrane 32. Brine discharge from the pressure vessel flows out through a needle valve 34 and an outlet port 36 for discharge through hull 11. The fresh product water from pressure vessel 30 is then delivered to a potable water storage tank 38. Water from the tank 38 can thereafter be pumped from the tank by a pump 40 and introduced into a vessel plumbing network where it can be used by vessel occupants for drinking, showering, washing, etc.

As pointed out above, desalination systems on small vessels, and watermaker systems of similar size, are usually not run continuously, and are often shut down for long periods of non-use in which the feed water stands in the operative flow path 20 between seacock 16 and discharge port 36. During the watermaker system shutdown period, bacteria and algae can grow in the piping, filter apparatus, pumps and RO membrane rendering subsequent use of the system inefficient or even inoperable. Moreover, the bacteria often goes anaerobic producing hydrogen sulfide which can permeate through the RO membrane and contaminate the product water in tank 38.

In many such systems, a fresh water flush sub-system is installed to flood the operative components of the system during shutdown to reduce the bacterial and algae counts in the system. However, if the system is to be decommissioned or shut down for more than a few days, chemicals must be circulated through the feed water flow path to sterilize flow line components and prevent the growth of bio film from the bacteria and algae contained therein.

In accordance with the present invention, a better solution to the problem is provided by installing a novel contamination preventing subsystem 12 along a conduit 44 forming a watermaker flush-water flow path between a connection 46 to a potable water supply plumbing network and a T-connection 48 to a feed water entry portion of the watermaker system. To insure that the flush-water is not lost through the system seacock 16, a check-valve is installed between the valve 14 and the subsystem T-connector 48. The subsystem 12 includes an on/off valve means 50 for opening and closing the flush-water flow path through conduit 44. The valve means 50 may consist of a manually operated gate valve, or the like, or an electrically or mechanically operated valve of a suitable type controlled by a watermaker system shut down or other controller.

The subsystem 12 may also include a suitable flow switch or other type of sensor 52 for detecting flow of flush-water through conduit 44 and reporting the flow condition to a suitable indicator or subsystem controller such as the ion-generator controller illustrated at 54.

Subsystem 12 further includes a novel filter/ion-generator component 56, disposed along the flush water flow path, a particular embodiment of which will be described in detail below. As suggested by FIG. 1 of the drawing, the controller 54 responds to an output developed by sensor 52 indicating flush-water flow in the conduit 44 has commenced, and in response thereto applies electrical power to the ion-generating element of the filter/ion-generator component 56, which in turn introduces copper and/or silver ions into the flush-water. Controller 54 is powered by and regulates DC power input thereto from a low voltage power source, such as the carrying vessel's DC batteries or other DC power supply 58, and output thereby to the ion-generator element of component 56.

As will also be described in more detail below, the filter element of component 56 is preferably a carbon block filter that separates undesirable chemicals, such as chlorine for example, from the flush-water received from the vessel's potable water supply, or other fresh water supply, to protect the RO filter membrane 32 in the desalination system 10.

Referring now to FIG. 2, a cross sectional view taken through an embodiment of the filter/ion-generator component 56 is depicted. As illustrated, the unit includes a mounting bracket and conduit coupling fixture 60, a filter element 62, a filter bowl 64 and a set of ionizing electrodes 66. To help visualize these components, an exploded perspective view thereof is shown in FIG. 3. A stand-alone view of an ion-generator assembly including the set of ionizing electrodes 66 is shown in FIG. 4.

The mounting bracket and coupling fixture 60 is adapted to be secured to an appropriate holder structure 61 by means of bolts or screws, or the like, and has a ¾ in. NPT threaded inlet 70 adapted to receive and threadably connect to the upstream side of a break in the conduit 44. Within the fixture body the inlet passageway turns downwardly to direct the incoming flow and form an inlet to the filter bowl 64. On the opposite side of the fixture 60, a ¾ in. NPT threaded outlet 74 is also provided to mate with the downstream side of the break in conduit 44 and to communicate with a downwardly extending nipple 76 forming a fluid exit path from bowl 64. Nipple 76 also forms a means for penetrating engagement with the upper end of the axially extending bore 63 through the tubular filter 62.

Bowl 64 is provided with an upper collar 78 that connects the bowl to fixture 60. A suitable gasket 80 assures a water-tight junction there between, and the connection is secured by a threaded coupling or a suitable clamp (not shown). As depicted, when installed, the filter 62 extends downwardly from fixture 60 to the bottom of bowl 64 where the central opening thereof mates with an upstanding nipple 82 forming the upper extremity of a PVC electrode holder 84.

Nipple 82 has an upwardly opening central bore 86 into which a length of ½ in. schedule 40 PVC pipe, or the like, is mounted, forming a flow tube 88 that extends upwardly to abut the lower extremity of nipple 76. A plurality of openings 90 circumscribe the lower end of tube 88 above the top of nipple 82 to provide flow paths into the tube. The outer diameter of flow tube 88 is substantially smaller than the inner diameter of the central bore 63 in filter 62, thereby forming a vertically extending passageway along the length of filter 62 such that water flowing through filter 62, as suggested by the arrows 83, flows down the outer side of tube 88 toward the openings 90.

Disposed within tube 88 and extending along substantially the entire length thereof are a plurality of metallic electrodes 66 that are secured to the holder 84 and held apart by non-conductive spacers 92 distributed along the length of the electrodes and held in place by O-rings. In the preferred embodiment, four ⅛ in. by 10 in. copper/silver electrodes 66 made of an alloy of primarily copper with a small amount (approximately 5%) of silver are used. The lower ends of the electrodes are appropriately soldered in pairs to each of two electrically conductive wires leading out of the bottom of holder 84 and extending to the controller 54 (FIG. 1).

It will thus be apparent that flush-water entering the unit 56 at input 70 will flow downwardly into bowl 64 and then through filter 62 to and down the passageway between the inner wall of the filter and the outer wall of tube 88, through the openings 90 at the bottom of the tube, and then upwardly along the electrodes 66 and finally exit the outlet 74 into the downstream portion of conduit 44 for flooding input to the watermaker flow path 20 via junction 48.

As illustrated in FIG. 3, the carbon filter can easily be replaced by disconnecting the bowl collar 78 from fixture 60, sliding the bowl assembly downwardly and withdrawing the electrode assembly from its coaxial nesting within the central opening of the filter. The filter 62 can then be pulled down and out of engagement with the nipple 76 and replaced. If the electrodes are also spent, the bowl and electrode assembly can be discarded and replaced with a new assembly. Or, if the electrodes are still in workable condition, the electrode/bowl assembly can simply be reinstalled. Alternatively, the electrode assembly depicted in FIG. 4 can be removeably configured relative to the bowl 64 such that it can be replaced without disconnecting the bowl 64.

Turning now to FIG. 5, an operative scenario involving actuation of a corrosion and contamination preventing subsystem in accordance with the present invention will be discussed. During operation of the associated watermaking system 10, valve 50 is closed and no water flows into and along conduit 44. However, as system 10 begins its shut down operation, valve 50 can and should be manually or automatically opened to allow fresh water to flow through first the carbon filter and then the ionizer assembly. To accomplish this, flow switch 52 will detect the flow and energize the controller 54 which will in turn apply voltage to the electrodes 66 (FIG. 2) as the water flows through the carbon filter 62 to and through the ionizer assembly as best depicted in FIG. 2. The controller 54 will monitor the current flowing across the electrodes 66 and adjust the DC voltage that is impressed on the electrodes to maintain a correct amount of ion exchange into the flow stream. In addition, as the current is monitored, the polarity of the voltage applied to the electrodes will be alternated, and thus the direction of the current flowing there across will be flipped in direction to prevent the electrodes from becoming passivated.

The fresh flush-water, laden with copper and silver ions, will then enter the system flow stream at the junction 48, flood the filters, pumps, and membranes that make up the system, displacing the slowing flow of process water, and disinfecting the entire watermaker system flow path from check valve 18 to brine discharge port 36. Following a predetermined interval and full shut down of the watermaker system, valve 50 will be closed and the watermaker system may then be left unattended until re-commissioned. During subsequent system start-up, little or no flushing is required as the quantities of copper and silver are quite low and are generally rejected by the RO membrane unit 32.

As previously mentioned, incorporation and use of the present invention in a watermaker system will greatly simplify the operation and maintenance of the system, as well as substantially reducing the cost, procurement and storage of chemicals that would otherwise be required to maintain the system.

The invention claimed is:

1. A contamination abatement subsystem for improving a desalinating watermaker system having a system flow path extending from a raw water intake port through pumping and filtering devices, including a reverse osmosis membrane filter, to a potable water storage tank, said subsystem being operative to introduce decontaminating flush water into the operative flow path of the watermaker system during a system shut down mode, comprising:
   a check valve disposed in said system flow path proximate said raw water intake port;
   conduit means forming a flush water flow path extending between an outlet of the potable water storage tank and a connection to said system flow path immediately downstream of the check valve;
   a valve means operatively disposed in said conduit means for selectively opening and closing the flush water flow path;
   a filter/ion-generator component operatively disposed along said flush water flow path between said valve means and said connection to said system flow path, said filter/ion-generator component including an elongated tubular carbon block filter element having an open passageway extending along the longitudinal axis thereof, an ion-generator element including a set of elongated ionizing electrodes for generating copper and/or silver ions disposed within said open passageway and longitudinally extending in parallel with and along the axis of the tubular filter element, and flow directing means for causing flush water entering said filter/ion-generator component to first be caused to flow radially through said filter element to remove undesirable chemicals therefrom, thereby becoming filtered flush water, and then be caused to flow along the lengths of said ionizing electrodes to introduce generated ions into the filtered flush water, said flow directing means including an elongated generally tubular filter bowl for housing said filter element and said ionizing electrodes, and a coupling fixture having an inlet port and an outlet port for coupling engagement with said conduit means; and a controller for sensing flush water through said conduit when said valve means is in an open state, and in response thereto, applying electrical power to the ion-generator element, whereby when the watermaker system is in the shut-down mode, and said valve means is in the open state, said controller senses flush water flow through said conduit means and applies power to said ion-generator element causing it to introduce copper and/or silver ions into the filtered flush water as said filtered flush water flows through said filter bowl and then through said conduit means and said connection into the operative flow path of the watermaker system to kill contaminants therein.

2. A contamination abatement subsystem as recited in claim 1 wherein said filter bowl has a second opening at a second end thereof for removably receiving said set of ionizing electrodes;

wherein said fixture is operative to close said first opening and to sealingly engage one end of said tubular filter element, and said inlet port is in fluid flow communicative relationship with at least a portion of an outside surface of said tubular filter element;

and wherein said flow directing means further includes flow tube means disposed within said open passageway and having one end thereof adapted to sealingly engage said coupling fixture and be in fluid communicative relationship with said outlet port, and having a second end thereof with said ionizing electrodes extending therethrough and along the length of said flow tube means, said second end being adapted to receive filtered flush water flowing out of said filter element, and to cause the filtered flush water to flow over said ionizing electrodes and out of said filter/ion generator component through said outlet port;

whereby said filter element is operative to remove undesirable chemicals from the flow of flush water entering said subsystem, and said ionizing electrodes are operative to introduce copper and/or silver ions into the flow of filtered flush water exiting said subsystem.

3. A desalinating watermaker system including pumping and filtering components disposed along an operative system flow path extending between a feed-water intake port and a reverse osmosis filter that produces potable water for collection in a storage tank, the watermaker system further including a system flow path decontaminating subsystem comprising:

a check-valve and T-connector installed in the system flow path proximate said intake port to facilitate entry of flush-water into said system flow path;

conduit means forming a flush-water path extending from the storage tank to said T-connector;

a valve means operatively disposed along said conduit means for selectively opening and closing the flush-water path during a shut-down mode of the watermaker system;

a coupling fixture disposed along said conduit means between said valve means and said T-connector;

a filter bowl removably connected to said coupling fixture and forming a segment of said flush-water flow path;

a filter/ion-generator component operatively disposed in said filter bowl, said component including a carbon block filter element for removing undesirable chemicals from flush-water flowing through said filter bowl to thereby form filtered flush-water, said filter element being generally tubular in shape and having an elongated passageway formed along its axis, said component further including an ion-generator element for generating copper and/or silver ions for introduction into the filtered flush-water, said ion-generator element including at least two elongated metal rods disposed in parallel with each other and extending along being elongated passageway, said fixture being configured to cause incoming flush-water to flow into said filter bowl, radially through said tubular filter element and then along the length of said metal rods before exiting the filter bowl; and a controller for sensing flush-water flowing through said conduit means when said valve means is in its open state, and in response thereto, applying electrical power to the ion-generator element, whereby when the watermaker system is in a shut-down mode, and said valve means is in its open state, said controller senses flush-water flow through said conduit means and applies power to said ion-generator element causing it to introduce copper and/or silver ions into the filtered flush-water before it is caused to flow into the operative flow-path of the watermaker to kill contaminants therein.

4. A filter/ion-generator apparatus for use in a flush water sub-system of a watermaker system, said apparatus comprising:

an elongated tubular carbon block filter element having an open passageway extending along the longitudinal axis thereof;

a set of elongated copper and/or silver metal ionizing electrodes configured to removably disposed within said open passageway and to extend in parallel with each other along the longitudinal axis of said tubular filter element;

an elongated generally tubular filter bowl housing said filter element and said ionizing electrodes, said filter bowl having a first opening at one end thereof for removably receiving said filter element, and a second opening at a second end thereof for removably receiving said set of ionizing electrodes;

a coupling fixture for closing said one opening and sealingly engaging one end of said filter element, said fixture having an inlet port and an outlet port for engagement with conduit means adapted to carry a flow of flush water to be filtered and ionized, said inlet port being in fluid flow communicative relationship with at least a portion of an outer surface of said tubular filter element; and tubular flow directing means disposed within and extending along said open passageway, and having one end thereof adapted to sealingly engage said coupling fixture and be in fluid flow communicative relationship with said outlet port, and a second end thereof adapted to receive filtered fluid water flowing through said filter element, and to cause the received filtered flush water to flow along the length of said ionizing electrodes and out of said apparatus through said outlet port;

whereby said filter element is operative to remove undesirable chemicals from a flow of flush water entering said apparatus, and whereby said ionizing electrodes, when electrically energized, are operative to introduce copper and/or silver ions into a flow of filtered flush water flowing through said tubular flow directing means.

5. A filter/ion-generator apparatus as recited in claim 4 wherein said ionizing electrodes are affixed to and carried by a removable electrode holder that also serves as a closure for said second opening in said filter bowl as well as a means for allowing outside electrical connection to said electrodes.

6. A filter/ion-generator apparatus as recited in claim 5 wherein said second end of said tubular flow directing means is also affixed to said electrode holder, said tubular flow directing means also being removable along with said electrodes.

* * * * *